US011868842B2

(12) United States Patent
Conticello

(10) Patent No.: US 11,868,842 B2
(45) Date of Patent: Jan. 9, 2024

(54) POINT-OF-SALE SCANNER SIGNALING TO A CAMERA

(71) Applicant: ZEBRA TECHNOLOGIES CORPORATION, Lincolnshire, IL (US)

(72) Inventor: Thomas Conticello, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 642 days.

(21) Appl. No.: 16/564,940

(22) Filed: Sep. 9, 2019

(65) Prior Publication Data

US 2021/0073494 A1 Mar. 11, 2021

(51) Int. Cl.
*G06K 7/14* (2006.01)
*G06Q 20/20* (2012.01)
*H04N 7/18* (2006.01)
*G06K 7/10* (2006.01)
*H04N 23/51* (2023.01)

(52) U.S. Cl.
CPC ......... *G06K 7/1404* (2013.01); *G06Q 20/208* (2013.01); *H04N 7/181* (2013.01); *H04N 7/188* (2013.01); *G06K 2007/10524* (2013.01); *H04N 23/51* (2023.01)

(58) Field of Classification Search
CPC ....... G06K 7/1404; G06K 2007/10524; G06Q 20/208; H04N 7/181; H04N 7/188; H04N 5/2252
USPC .......................................................... 705/23
See application file for complete search history.

(56) References Cited

U.S. PATENT DOCUMENTS

| 7,909,248 | B1 | 3/2011 | Goncalves |
| 8,807,432 | B2 | 8/2014 | Van Horn et al. |
| 9,589,433 | B1* | 3/2017 | Thramann ............. G01S 3/7864 |
| 2009/0026270 | A1 | 1/2009 | Connell, II et al. |
| 2018/0314863 | A1* | 11/2018 | Gao .................. G06K 7/10831 |
| 2019/0180264 | A1* | 6/2019 | Crooks .................. H04N 7/183 |

FOREIGN PATENT DOCUMENTS

| EP | 3092597 A1 | 7/2015 |
| GB | 2451073 A | 1/2009 |

OTHER PUBLICATIONS

Combined Search and Examination Report for United Kingdom Patent Application No. 2011353.6 dated Jan. 14, 2021.

(Continued)

*Primary Examiner* — Matthew David Kim

(57) ABSTRACT

A method, system and barcode reader for transmitting barcode scan information from a barcode reader to an external imaging system including one or more image capturing devices when the barcode reader is within a field of view of the external imaging system. Responsive to successfully decoding an indicia, the barcode reader transmits, to the external imaging system via an optical signal assembly, a first optical signal based at least in part on the indicia. Responsive to detecting an object within a product scanning region of the barcode reader and no successful decode of an indicia, the barcode reader transmits, to the external imaging system via the optical signal assembly, a second optical signal indicating the object being passed within the product scanning region with no successful decode.

20 Claims, 5 Drawing Sheets

(56) References Cited

OTHER PUBLICATIONS

Garg N.: Improving Business Logistics using Barcode Scanners. In: International Journal of Computer Applications, 50, Jul. 2012, 15, 1-5. http://citeseerx.ist.psu.edu/viewdoc/download?doi=10.1.1.259. 59&rep=rep1&type=pdf [retrieved on Dec. 7, 2021].
Office Action for German Patent Application No. 10202011430.7 dated Dec. 8, 2021.

* cited by examiner

POINT-OF-SALE SCANNER SIGNALING TO A CAMERA

FIELD OF THE INVENTION

At least some embodiments of the present invention generally relate to devices, systems, and methods associated with optical data capture, and more specifically to devices, systems, and methods for illuminating barcodes and capturing barcode data.

BACKGROUND OF THE INVENTION

At self-checkout systems, barcode reader may not always scan items correctly. To remedy this issue, camera based surveillance systems may be used to monitor the self-checkout systems. However, the surveillance systems are not be able to detect certain issues at self-checkout systems. For example, if a customer attempts to scan an item using a barcode reader but the barcode is not decoded, the surveillance system may nevertheless determine the object to be properly scanned. Additionally, if a customer scans an item properly but the item is tagged with the incorrect barcode, the surveillance system may also incorrectly determine the object to be properly scanned. Accordingly, there is a need for improved systems, methods, and devices which address these issues.

SUMMARY

In an embodiment, the present invention is a method for transmitting barcode scan information. The method includes: detecting a triggering event at a barcode reader, wherein the barcode reader is within a first field of view defined by one or more image capturing devices of an external imaging system, the external imaging system being external to the barcode reader; responsive to detecting the triggering event at the barcode reader, capturing, by the barcode reader, a plurality of images of an environment appearing within a second field of view defined by the barcode reader; attempting to decode, at the barcode reader, an indicia appearing within at least one of the plurality of images; and performing at least one of: responsive to successfully decoding the indicia, transmitting, from the barcode reader to the external imaging system and via an optical signal assembly, a first optical signal based at least in part on the indicia, and responsive to detecting an object within a product scanning region of the barcode reader and no successful decode of the indicia, transmitting, from the barcode reader to the external imaging system and via the optical signal assembly, a second optical signal indicating the object being passed within the product scanning region with no successful decode.

The optical signal assembly may be an infrared (IR) signal assembly. The optical signal assembly may also be a Bluetooth (BLE) signal assembly.

The indicia may correspond to the object within the product scanning region of the barcode reader the first optical signal may include information identifying the object based on the indicia.

The method may further include: transmitting, from the barcode reader to the external imaging system and via the optical signal assembly, a third optical signal based at least in part on the operating condition of the barcode reader. The method may also further include: transmitting at least one of the first optical signal and the second optical signal to a point-of-sale system.

In another embodiment, the present invention is a system for transmitting barcode scan information. The system includes: an external imaging system including one or more image capturing devices, wherein the one or more image capturing devices define a first field of view; and a barcode reader located within the first field of view. The barcode reader is configured to: detect a triggering event; responsive to detecting the triggering event, capture a plurality of images of an environment appearing within a second field of view defined by the barcode reader; attempt to decode an indicia appearing within at least one of the plurality of images; and perform at least one of: responsive to successfully decoding the indicia, transmit, to the external imaging system via an optical signal assembly, a first optical signal based at least in part on the indicia, and responsive to detecting an object within a product scanning region of the barcode reader and no successful decode of the indicia, transmit, to the external imaging system via the optical signal assembly, a second optical signal indicating the object being passed within the product scanning region with no successful decode.

In yet another embodiments, the present invention is a barcode reader located within a first field of view defined by one or more image capturing devices of an external imaging system, the external imaging system being external to the barcode reader. The barcode reader includes: a housing; an imaging assembly positioned at least partially within the housing; an image decoder positioned at least partially within the housing; an optical signal assembly; and a controller communicatively coupled to the imaging assembly, the image decoder, and the optical signal assembly. The controller is configured to: detect a triggering event, responsive to detecting the triggering event at the barcode reader, cause the imaging assembly to capture a plurality of images of an environment appearing within a second field of view defined by the barcode reader, responsive to the plurality of images being captured, cause the decoder to attempt to decode an indicia appearing within at least one of the plurality of images; and perform at least one of: responsive to receiving a successful decode of the indicia from the decoder, cause the optical signal assembly to transmit, to the external imaging system, a first optical signal based at least in part on the indicia, and responsive to detecting an object within a product scanning region of the barcode reader and receiving an unsuccessful decode of the indicia from the decoder, cause the optical signal assembly to transmit, to the external imaging system, a second optical signal indicating the object being passed within the product scanning region with no successful decode.

The controller may further be configured to cause the optical signal assembly to transmit, to the external imaging system, a third optical signal based at least in part on the operating condition of the barcode reader. The controller may also be further configured to cause the optical signal assembly to transmit at least one of the first optical signal and the second optical signal to a point-of-sale system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
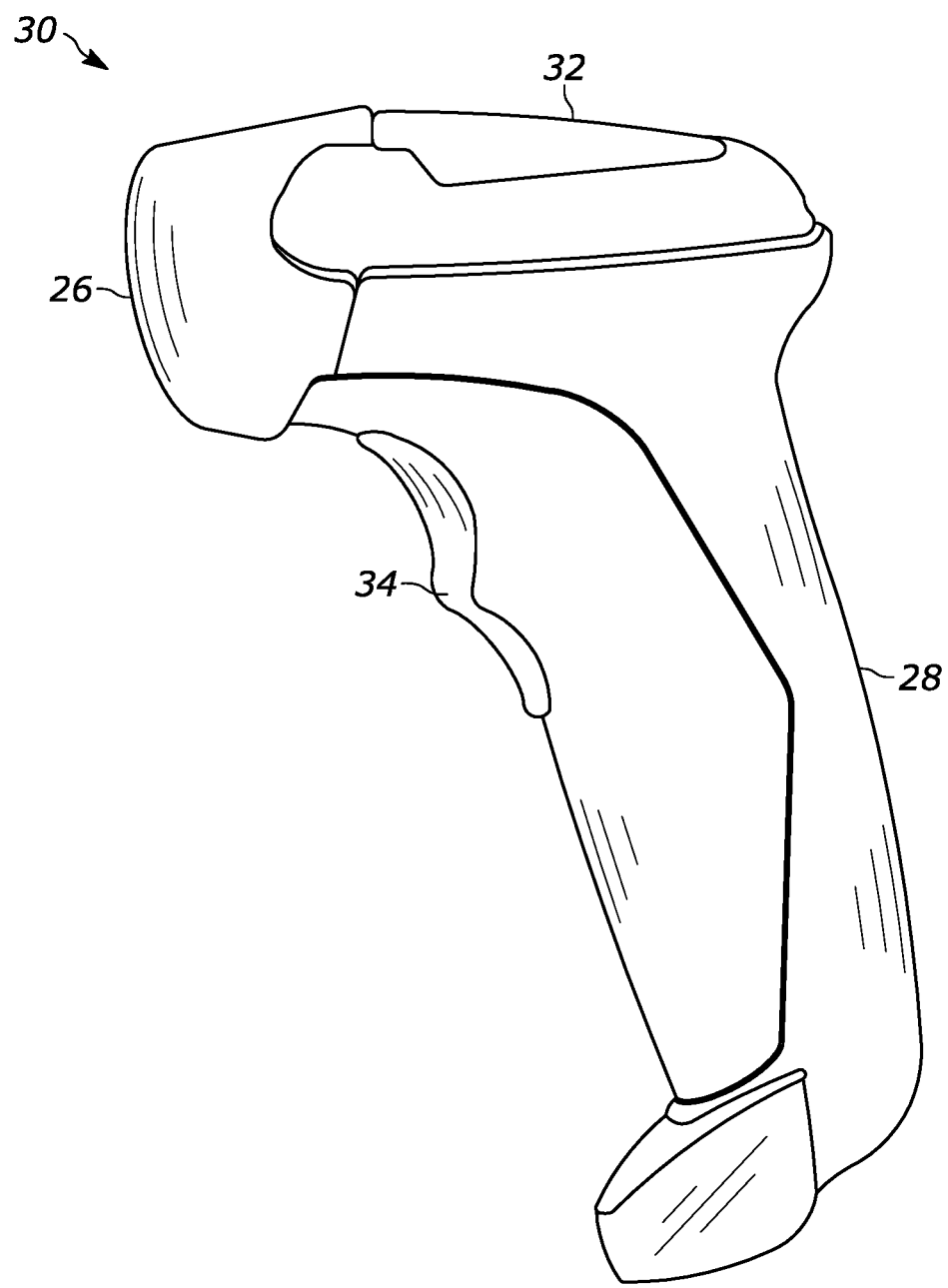
FIG. 1 is a side elevation view of a portable, handheld barcode reader operative for transmitting barcode scan information to an external imaging system in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, reference numeral 30 in FIG. 1 generally identifies a barcode reader configured as a gun-shaped housing having an upper barrel or body 32 and a lower handle 28 positioned rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The barcode reader 30 is held in an operator's hand and used in a handheld mode in which a trigger 34 is manually depressed to initiate imaging of targets or objects, especially barcode symbols. Housings of other configurations, as well as readers operated in the hands-free mode, could also be employed.

Figure 2:
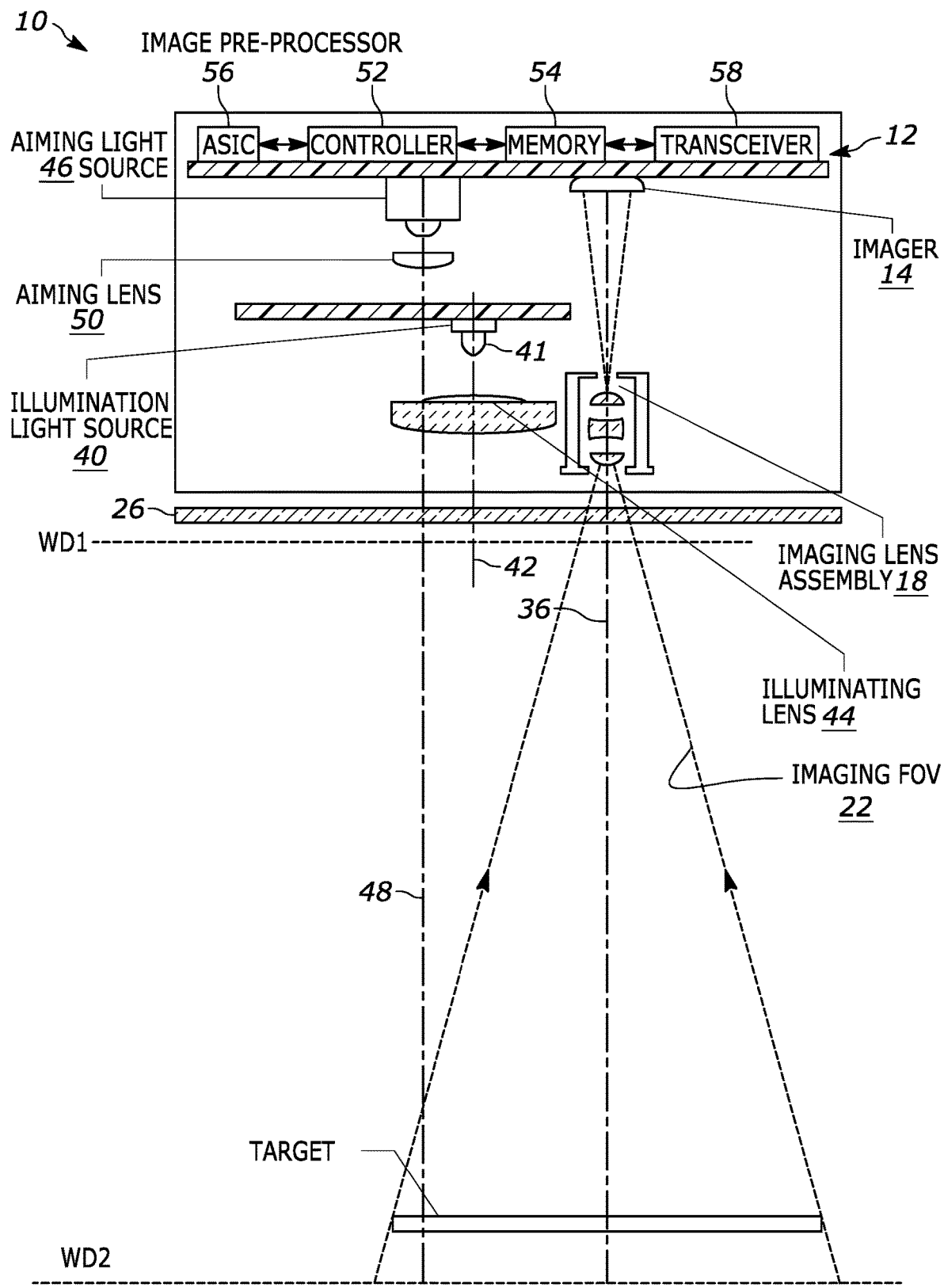
FIG. 2 is a schematic diagram of various components, including imaging, illuminating, and aiming light assemblies supported on an imaging module that is mounted inside the reader of FIG. 1.
Figure 3:
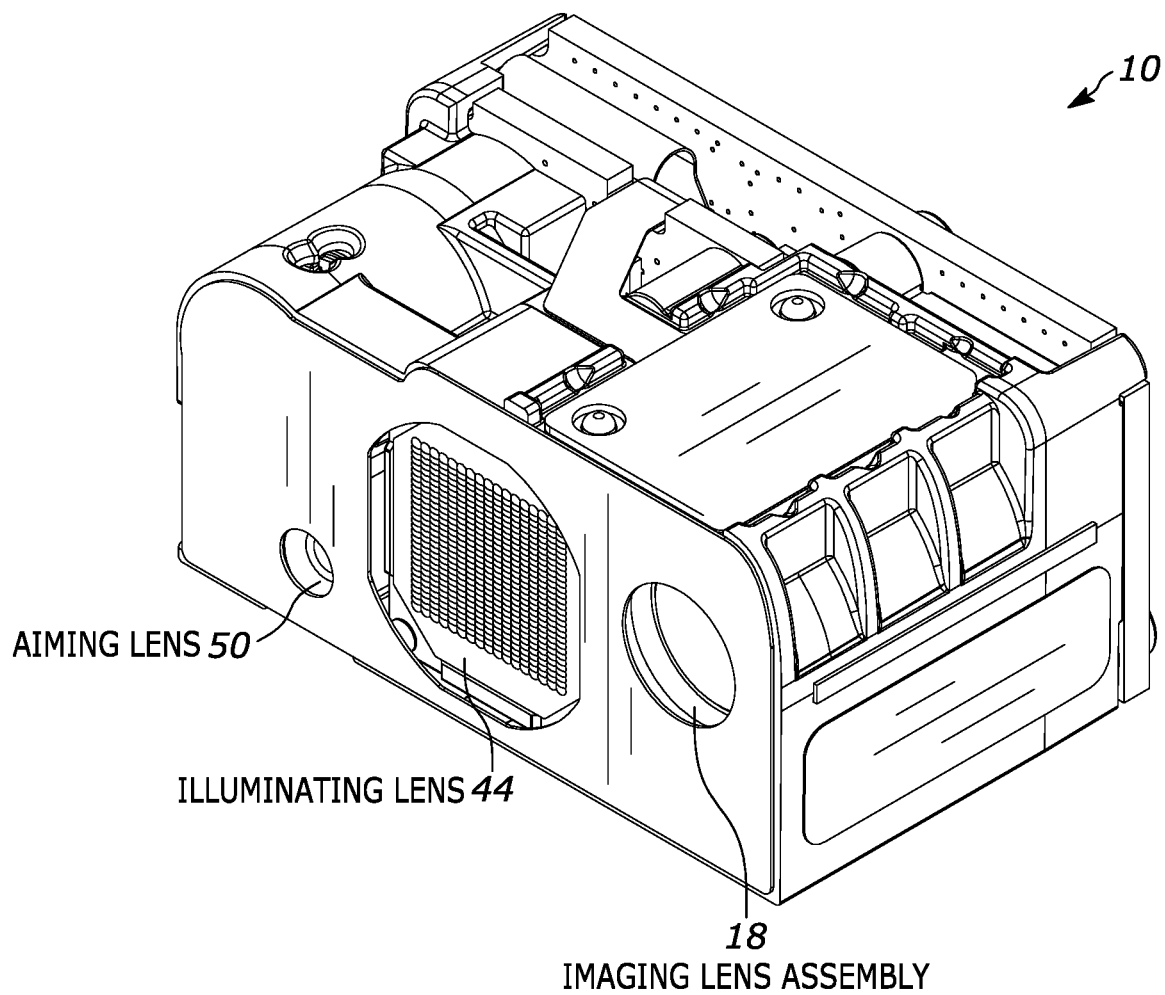
FIG. 3 is a perspective view of the imaging module of FIG. 2 in isolation.

As schematically shown in FIG. 2, and as more realistically shown in FIG. 3, an imaging assembly or module 10 is mounted in the barcode reader 30 behind the window 26. An object to be read by the imaging assembly may be located anywhere in a working range of distances between a close-in working distance (WD1) and a far-out working distance (WD2).

The assembly 10 includes an imaging capturing system 12 that has an imaging sensor or imager 14 and an imaging lens assembly 18 for capturing return light over a generally rectangular imaging field of view 22, e.g., between about ten degrees and about thirty degrees, from a target located at any region of the range, e.g., from about zero inches to about 300 inches away from the window 26, and for projecting the captured return light onto the imager 14. Although only a single imager 14 and imaging lens assembly 18 is illustrated in FIG. 2, it will be understood that any number of imagers and imaging lens assemblies could be provided in the assembly 10.

The imager 14 is a solid-state device, for example, a CCD or a CMOS imager having an array of addressable image sensors or pixels arranged in a single, linear row, or preferably a two-dimensional array of such sensors arranged in mutually orthogonal rows and columns, and operative for detecting return light captured by the imaging lens assembly 18 along the imaging axis 36 through the window 26. In some examples, the imaging lens assembly is advantageously a Cooke triplet. The imaging lens assembly 18 may have a fixed or a variable focus by implementing a variable focus element and/or a movable lens assembly (not shown).

As also shown in FIGS. 2 and 3, an illumination assembly 40 is also supported by the imaging assembly 10 and includes an illumination light source, e.g., at least one light emitting diode (LED) 41, stationarily mounted on an optical axis 42, and an illuminating lens assembly that includes an illuminating lens 44 also centered on the optical axis 42.

As further shown in FIGS. 2 and 3, an aiming light assembly is also supported by the imaging assembly 10 and includes an aiming light source 46, e.g., a laser, stationarily mounted on an aiming axis 48, and an aiming lens 50 centered on the aiming axis 48. The aiming lens 50 may include a diffractive or a refractive optical element, and is operative for projecting a visible aiming light pattern along the aiming axis 48 on the target prior to reading. In some examples, the aiming light pattern includes an aiming light spot, preferably of generally circular shape. The aiming light assembly may function as a rangefinder to assist in determining a working distance from the device 10 to the object.

As further shown in FIG. 2, the image capturing system 12, the imager 14, the LED 41, and the laser 46 are operatively connected to a controller or programmed microprocessor 52 operative for controlling the operation of these components. A memory 54 is connected and accessible to the controller 52. Preferably, the controller 52 is the same as the one used for processing the return light from the targets and for decoding the captured target images. Alternatively, the controller 52 may be operatively coupled to an image decoder (not pictured) configured to process the return light from the targets for decoding the captured target images. An image pre-processor 56 is also operatively coupled to the controller 52, and in some examples, may be arranged in a custom application-specific integrated circuit (ASIC) or a field-programmable gate array (FPGA) that is operatively connected between the imager 14 and the controller 52 for pre-processing the images captured by the imager 14. The image pre-processor 56 may, in some applications, be integrated with the controller 52.

A transceiver 58 is also operatively coupled to the controller 52, and in some examples, may be an infrared (IR) signal assembly or a Bluetooth (BLE) signal assembly. The transceiver 58 may transmit information received from the controller 52 to one or more external systems or devices, as discussed in more detail below.

The controller 52 may be configured to detect a triggering event (e.g. a depression of the trigger 34 of the reader 30). In response to the triggering event, the controller 52 may cause the imaging assembly 10 including the image capturing system 12, imager 14, and the imaging lens assembly 18, to capture one or more images. The one or more images may describe an environment appearing within a field of view 22 defined by the reader 30. In response to the one or more images being captured by the imaging assembly 10 and optionally pre-processed by the image pre-processor 56, the controller 52 may attempt to decode an indicia appearing within at least one of the one or more images. In one implementation, the controller 52 may attempt to decode the indicia itself. Optionally, the controller 52 cause an image decoder (not pictured) to attempt to decode the indicia. The indicia may be a barcode.

In response to receiving a successful decode of the indicia from the image decoder (not pictured) or successfully decoding the indicia at the controller 52, the controller 52 may cause the transceiver 58 to transmit a signal based at least in part on the indicia. Optionally, the indicia may correspond to an object within the product scanning region of the barcode reader 30 (e.g. the indicia is a barcode of an object being purchased) and the transmitted signal may include information identifying the object based on the indicia (e.g. the signal includes an descriptor of the object being purchased).

In response to receiving an unsuccessful decode of the indicia from the image decoder (not pictured) or unsuccessfully decoding the indicia at the controller 52, the controller 52 may cause the transceiver 58 to transmit another signal. The signal may be transmitted in response to detecting an object within a product scanning region of the barcode reader 30. The another signal may indicate that an object was present in the product scanning region but no successful decode of an indicia occurred. Optionally, the controller 52 may cause the transceiver 58 to transmit a still further optical signal based at least in part on the operating condition of the barcode reader 30. The still further optical signal may indicate that the barcode reader 30 is malfunctioning and provide a reason for the malfunction.

As described above, camera based surveillance systems may not be able to adequately monitor activity at self-checkout systems. One aspect of this disclosure is directed to enabling a barcode reader to transmit information regarding activity at the reader to an external imaging system to allow more accurate monitoring of the use of the reader.

Figure 4:
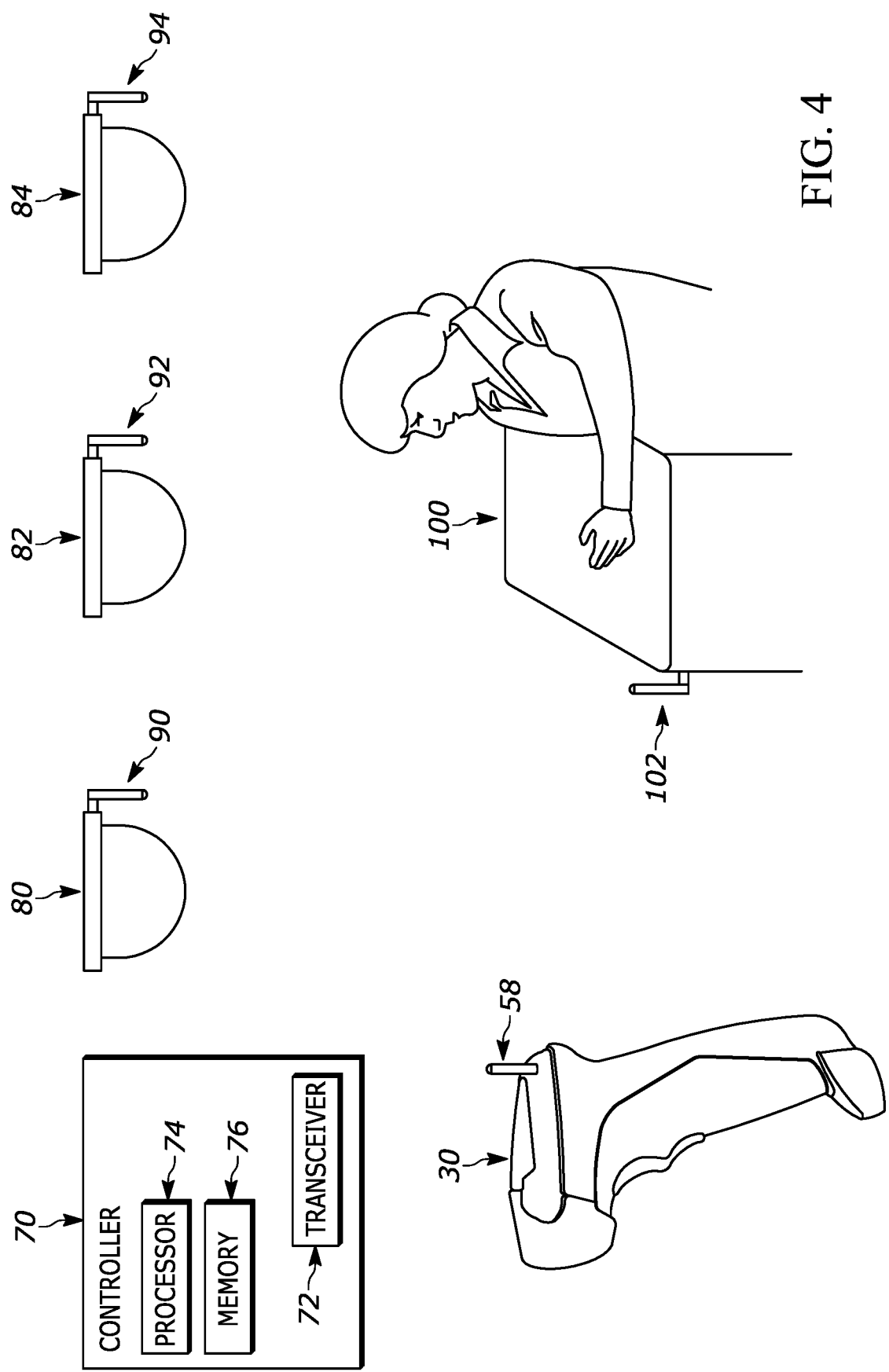
FIG. 4 is a schematic diagram of a system including a barcode reader and an external imaging system operative for transmitting barcode scan information to the external imaging system.

As shown in FIG. 4 barcode reader 30 including transmitter 58 may be in communication with a controller 70 of an external imaging system. The external imaging system may further include one or more image capturing devices 80, 82, and 84. The image capturing devices may be security cameras. Each image capturing devices may include a corresponding transceiver 90, 92, and 94. The barcode reader 30 may located within a field of view defined by one or more of the image capturing devices 80, 82, and 84. Optionally, the barcode reader 30 and the controller 70 may be further communicatively coupled to a point-of-sale system 100 via a transceiver 102 of the point of sale system 100.

The controller 70 may include a processor 74, a memory 76, and a transceiver 72. The transceiver 72 may receive a signal sent from barcode reader 30 via transceiver 58, (e.g. a signal based at least in part on an indicia corresponding to an object, a signal indicating an object being passed within the product scanning region with no successful decode of an indicia, and a signal indicating the operating condition of the barcode reader 30). Further, a signal (e.g. a signal based at least in part on an indicia corresponding to an object, a signal indicating an object being passed within the product scanning region with no successful decode of an indicia, and a signal indicating the operating condition of the barcode reader 30) may be sent from the barcode reader 30 to the point of sale system 100.

Figure 5:
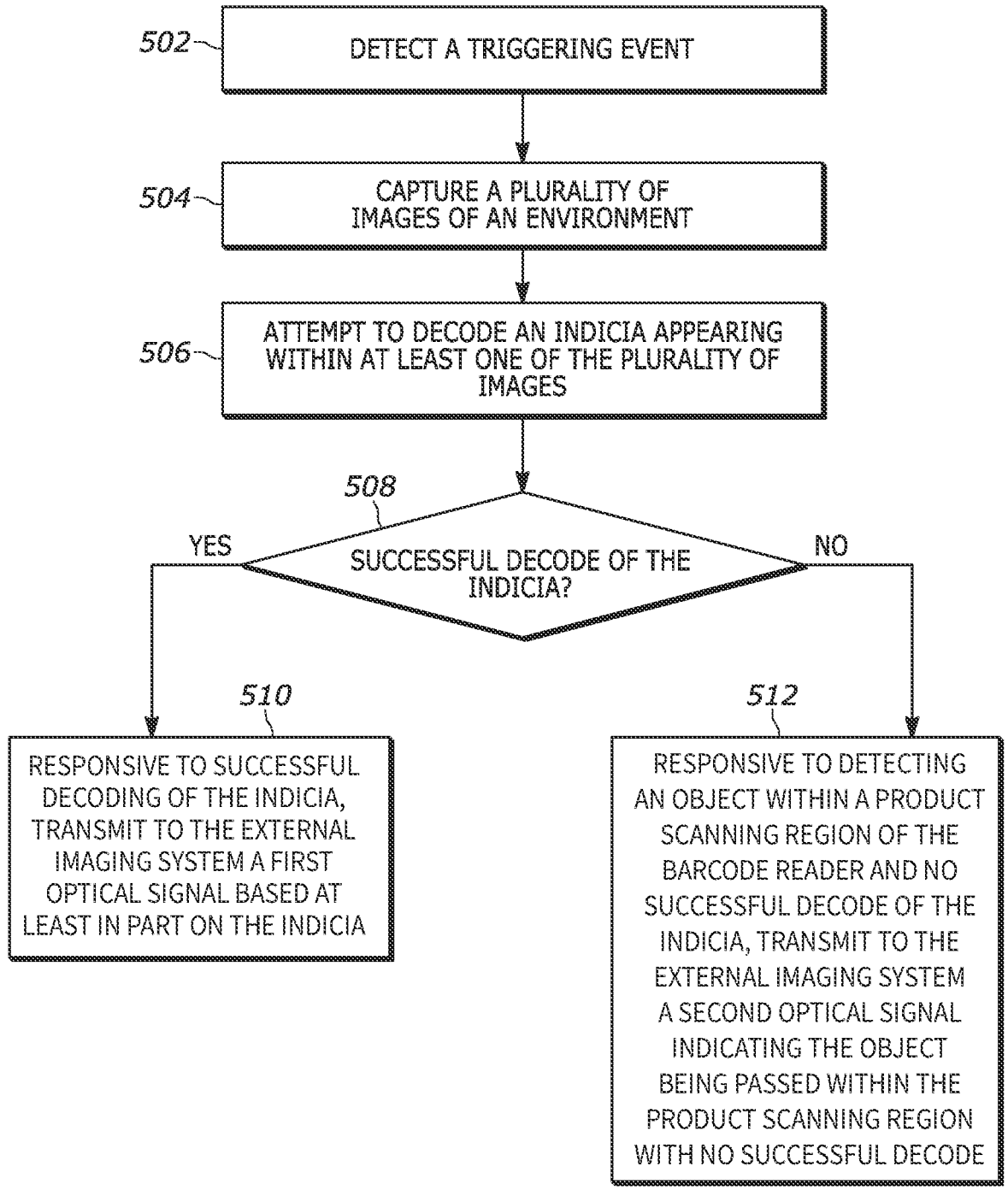
FIG. 5 is a flow chart depicting steps performed in a method of transmitting barcode scan information to an external imaging system.

As shown in the flow chart of FIG. 5, the method is performed in step 502 by detecting a triggering event at the barcode reader 30, wherein the barcode reader 30 is within a first field of view defined by one or more image capturing devices 80, 82, and 84 of an external imaging system, the external imaging system being external to the barcode reader 30. Next, responsive to detecting the triggering event at the barcode reader 30, the reader 30 captures a plurality of images of an environment appearing within a second field of view defined by the barcode reader 30 at step 504. At step 506, the barcode reader 30 attempts to decode an indicia appearing within at least one of the plurality of images. At step 508, the barcode reader 30 determines whether there is a successful decode of the indicia. Responsive to successfully decoding the indicia the barcode reader 30 transmits to the external imaging system 70 and via a transceiver 58, a first optical signal based at least in part on the indicia at step 510. At step 512, responsive to detecting an object within a product scanning region of the barcode reader 30 and no successful decode of the indicia, the barcode reader 30 transmits to the external imaging system 70 and via the transceiver 58, a second optical signal indicating the object being passed within the product scanning region with no successful decode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for transmitting barcode scan information, the method comprising:
   detecting a triggering event at a barcode reader, wherein the barcode reader is within a first field of view defined by one or more image capturing devices of an external imaging system, the external imaging system being external to the barcode reader;
   responsive to detecting the triggering event at the barcode reader, capturing, by the barcode reader, a plurality of images of an environment appearing within a second field of view defined by the barcode reader;
   attempting to decode, at the barcode reader, an indicia appearing within at least one of the plurality of images; and
   performing at least one of:
      responsive to successfully decoding the indicia, transmitting, from the barcode reader to the external imaging system and via an optical signal assembly, a first optical signal based at least in part on the indicia, and
      responsive to detecting an object within a product scanning region of the barcode reader and no successful decode of the indicia, transmitting, from the barcode reader to the external imaging system and via the optical signal assembly, a second optical signal indicating the object being passed within the product scanning region with no successful decode.

2. The method of claim 1, wherein the optical signal assembly is an infrared (IR) signal assembly.

3. The method of claim 1, wherein the optical signal assembly is a Bluetooth (BLE) signal assembly.

4. The method of claim 1, wherein the indicia corresponds to the object within the product scanning region of the barcode reader and wherein the first optical signal includes information identifying the object based on the indicia.

5. The method of claim 1, further comprising transmitting, from the barcode reader to the external imaging system and via the optical signal assembly, a third optical signal based at least in part on the operating condition of the barcode reader.

6. The method of claim 1, further comprising transmitting at least one of the first optical signal and the second optical signal to a point-of-sale system.

7. A system for transmitting barcode scan information, the system comprising:
   an external imaging system including one or more image capturing devices, wherein the one or more image capturing devices define a first field of view; and
   a barcode reader located within the first field of view, the barcode reader configured to:
   detect a triggering event;
   responsive to detecting the triggering event, capture a plurality of images of an environment appearing within a second field of view defined by the barcode reader;
   attempt to decode an indicia appearing within at least one of the plurality of images; and
   perform at least one of:
      responsive to successfully decoding the indicia, transmit, to the external imaging system via an optical signal assembly, a first optical signal based at least in part on the indicia, and
      responsive to detecting an object within a product scanning region of the barcode reader and no successful decode of the indicia, transmit, to the external imaging system via the optical signal assembly, a second optical signal indicating the object being passed within the product scanning region with no successful decode.

8. The system of claim 7, wherein the optical signal assembly is an infrared (IR) signal assembly.

9. The system of claim 7, wherein the optical signal assembly is a Bluetooth (BLE) signal assembly.

10. The system of claim 7, wherein the indicia corresponds to the object within the product scanning region of the barcode reader and wherein the first optical signal includes information identifying the object based on the indicia.

11. The system of claim 7, wherein the barcode reader is further configured transmit, to the external imaging system via the optical signal assembly, a third optical signal based at least in part on the operating condition of the barcode reader.

12. The system of claim 7, wherein the barcode reader is further configured to transmit at least one of the first optical signal and the second optical signal to a point-of-sale system.

13. The system of claim 7, wherein the one or more image capturing devices of the external imaging system comprise a plurality of cameras, each camera connected to a respective transceiver.

14. A barcode reader located within a first field of view defined by one or more image capturing devices of an external imaging system, the external imaging system being external to the barcode reader, the barcode reader comprising:
- a housing;
- an imaging assembly positioned at least partially within the housing;
- an image decoder positioned at least partially within the housing;
- a transmitter; and
- a controller communicatively coupled to the imaging assembly, the image decoder, and the transmitter and configured to:
- detect a triggering event,
- responsive to detecting the triggering event at the barcode reader, cause the imaging assembly to capture a plurality of images of an environment appearing within a second field of view defined by the barcode reader,
- responsive to the plurality of images being captured, cause the decoder to attempt to decode an indicia appearing within at least one of the plurality of images; and
- perform at least one of:
  - responsive to receiving a successful decode of the indicia from the decoder, cause the optical signal assembly to transmit, to the external imaging system, a first optical signal based at least in part on the indicia, and
  - responsive to detecting an object within a product scanning region of the barcode reader and receiving an unsuccessful decode of the indicia from the decoder, cause the optical signal assembly to transmit, to the external imaging system, a second optical signal indicating the object being passed within the product scanning region with no successful decode.

15. The barcode reader of claim 14, wherein the optical signal assembly is an infrared (IR) signal assembly.

16. The barcode reader of claim 14, wherein the optical signal assembly is a Bluetooth (BLE) signal assembly.

17. The barcode reader of claim 14, wherein the indicia corresponds to the object within the product scanning region of the barcode reader and wherein the first optical signal includes information identifying the object based on the indicia.

18. The barcode reader of claim 14, wherein the controller is further configured to cause the optical signal assembly to transmit, to the external imaging system, a third optical signal based at least in part on the operating condition of the barcode reader.

19. The barcode reader of claim 14, wherein the controller is further configured to cause the optical signal assembly to transmit at least one of the first optical signal and the second optical signal to a point-of-sale system.

20. The barcode reader of claim 14, wherein the controller is further configured to perform both of:
- responsive to receiving the successful decode of the indicia from the decoder, cause the optical signal assembly to transmit, to the external imaging system including the one or more image capturing devices, the first optical signal based at least in part on the indicia, and
- responsive to detecting the object within a product scanning region of the barcode reader and receiving the unsuccessful decode of the indicia from the decoder, cause the optical signal assembly to transmit, to the external imaging system including the one or more image capturing devices, the second optical signal indicating the object being passed within the product scanning region with no successful decode.

* * * * *